(12) United States Patent
Takahashi

(10) Patent No.: US 9,019,105 B2
(45) Date of Patent: Apr. 28, 2015

(54) ANIMAL EMOTION DISPLAY SYSTEM AND METHOD

(75) Inventor: Hiroki Takahashi, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 429 days.

(21) Appl. No.: 12/834,066

(22) Filed: Jul. 12, 2010

(65) Prior Publication Data

US 2011/0018717 A1    Jan. 27, 2011

(30) Foreign Application Priority Data

Jul. 23, 2009    (JP) .................................. 2009-171770

(51) Int. Cl.
- *G08B 21/00* (2006.01)
- *A01K 29/00* (2006.01)
- *A01K 11/00* (2006.01)

(52) U.S. Cl.
CPC ............. *A01K 29/005* (2013.01); *A01K 11/008* (2013.01)

(58) Field of Classification Search
CPC ........................... A01K 11/008; A01K 29/005
USPC ..................... 340/573.2, 573.3, 691.1, 691.6; 119/858, 718

See application file for complete search history.

(56) References Cited

U.S. PATENT DOCUMENTS

| | | | | |
|---|---|---|---|---|
| 4,695,975 A | * | 9/1987 | Bedrij | 715/202 |
| 5,790,033 A | * | 8/1998 | Yamamoto | 340/573.1 |
| 5,857,434 A | * | 1/1999 | Andersson | 119/859 |
| 6,675,744 B1 | * | 1/2004 | Levan | 119/858 |
| 2008/0036610 A1 | * | 2/2008 | Hokuf et al. | 340/573.3 |
| 2008/0264349 A1 | * | 10/2008 | Hoegh et al. | 119/718 |
| 2010/0030036 A1 | * | 2/2010 | Mottram et al. | 600/301 |

FOREIGN PATENT DOCUMENTS

| | | |
|---|---|---|
| CN | 1506936 A | 6/2004 |
| CN | 101472469 A | 7/2009 |
| JP | 2005-520526 A | 10/2003 |
| JP | 2004-212544 A | 7/2004 |
| JP | 2007-124966 A | 5/2007 |
| JP | 2009-136212 A | 6/2009 |

OTHER PUBLICATIONS

Japanese Office Action dated Aug. 16, 2011 (and English translation thereof) in counterpart Japanese Application No. 2009-171770.

(Continued)

*Primary Examiner* — Mark Rushing
(74) *Attorney, Agent, or Firm* — Holtz, Holtz, Goodman & Chick PC

(57) ABSTRACT

An animal emotion display system 100 including: a transmitter 10 which is attached to an animal; and a receiver 20 which is capable of communicating with the transmitter, wherein the transmitter 10 includes: a tail wagging detection sensor 12 to detect a plurality of kinds of tail wagging of the animal as a plurality of kinds of emotion of the animal, respectively; and a transmitting section 15 to transmit emotion data corresponding to the respective kinds of tail wagging detected by the tail wagging detection sensor 12 to the receiver 20, and the receiver 20 includes: a receiving section 22 to receive the emotion data transmitted by the transmitting section 15; a display section 25; and a display control section 24 to display a display content corresponding to the emotion data received by the receiving section 22 on the display section 25.

14 Claims, 9 Drawing Sheets

(56) References Cited

OTHER PUBLICATIONS

Chinese Office Action dated Dec. 7, 2011 (and English translation thereof) in counterpart Chinese Application No. 201010237340.8.

Japanese Office Action dated Jan. 29, 2013 (and English translation thereof) in counterpart Japanese Application No. 2009-171770.
Chinese Office Action dated Mar. 12, 2013 (and English translation thereof) in counterpart Chinese Application No. 201010237340.8.

* cited by examiner

FIG. 4

| TAIL WAGGING DATA | EMOTION DATA |
|---|---|
| WAG TAIL RIGHT AND LEFT STARTING FROM RIGHT IN CYCLE FASTER THAN PRESCRIBED CYCLE | GOOD MOOD 1 |
| WAG TAIL TO AND FROM THE BACK | GOOD MOOD 2 |
| WAG TAIL RIGHT AND LEFT STARTING FROM LEFT IN CYCLE SLOWER THAN PRESCRIBED CYCLE | BAD MOOD |
| WAG TAIL SLOWLY | WELCOME |
| LOWER TAIL | SCARE |
| THE OTHER TAIL WAGGINGS | NONE |

| EMOTION DATA | DISPLAY CONTENT |
|---|---|
| GOOD MOOD 1 | I AM HAPPY |
| GOOD MOOD 2 | I AM HAPPY |
| BAD MOOD | LEAVE ME ALONE (BAD MOOD) |
| WELCOME | YOU ARE WELCOME HERE |
| SCARE | I AM SCARED |
| NONE | . . . |

T2

ANIMAL EMOTION DISPLAY SYSTEM AND METHOD

CROSS-REFERENCE TO RELATED APPLICATIONS

This application is based upon and claims the benefit of priority from the prior Japanese Patent Application No. 2009-171770, filed on Jul. 23, 2009, and the entire contents thereof are incorporated herein by reference.

BACKGROUND OF THE INVENTION

1. Field of the Invention

The present invention relates to an animal emotion display system and an animal emotion display method, the animal such as a dog and a cat as a pet.

2. Description of the Related Art

As a conventional art, Japanese Translation Publication of PCT International Application No. 2005-520526 (Patent Document 1) discloses a vocal connection system between humans and animals. The system is positioned on a part of an animal body, and a vocal message is emitted based on an electric signal which represents a condition of the animal, the electric signal into which a stimulus and the like detected on the animal body is converted.

However, the vocal connection system disclosed in Patent Document 1 is composed of a single unit which is positioned on a part of an animal body. Consequently, a problem arises that emotions of an animal cannot be appropriately understood from a place which is away from where the animal is.

BRIEF SUMMARY OF THE INVENTION

In view of the circumstances, an object of the present invention is to achieve appropriate understanding of emotions of an animal without a need to be at the animal's side.

According to a first aspect of the present invention, there is provided an animal emotion display system including: a transmitter which is attached to an animal; and a receiver which is capable of communicating with the transmitter, wherein the transmitter includes: a detection section to detect a plurality of kinds of tail wagging of the animal as a plurality of kinds of emotion of the animal, respectively; and a transmitting section to transmit emotion data corresponding to the respective kinds of tail wagging detected by the detection section to the receiver, and the receiver includes: a receiving section to receive the emotion data transmitted by the transmitting section; a display section; and a display control section to display a display content corresponding to the emotion data received by the receiving section on the display section.

According to a second aspect of the present invention, there is provided an animal emotion display method using an animal emotion display system including a transmitter which is attached to an animal and a receiver which is capable of communicating with the transmitter, the animal emotion display method including the steps of: detecting a plurality of kinds of tail wagging of an animal as a plurality of kinds of emotion of the animal, respectively, by the transmitter; transmitting emotion data corresponding to the respective kinds of tail wagging detected by the transmitter to the receiver; receiving the emotion data by the receiver, the emotion data being transmitted by the transmitter; and outputting a display content corresponding to the received emotion data to a display section of the receiver.

BRIEF DESCRIPTION OF THE SEVERAL VIEWS OF THE DRAWINGS

FIG. 4 is a chart showing a first table T1 stored in an emotion data storage section;

FIG. 6 is a chart showing a second table T2 stored in a display content storage section;

DETAILED DESCRIPTION OF THE PREFERRED EMBODIMENTS

Figure 1:
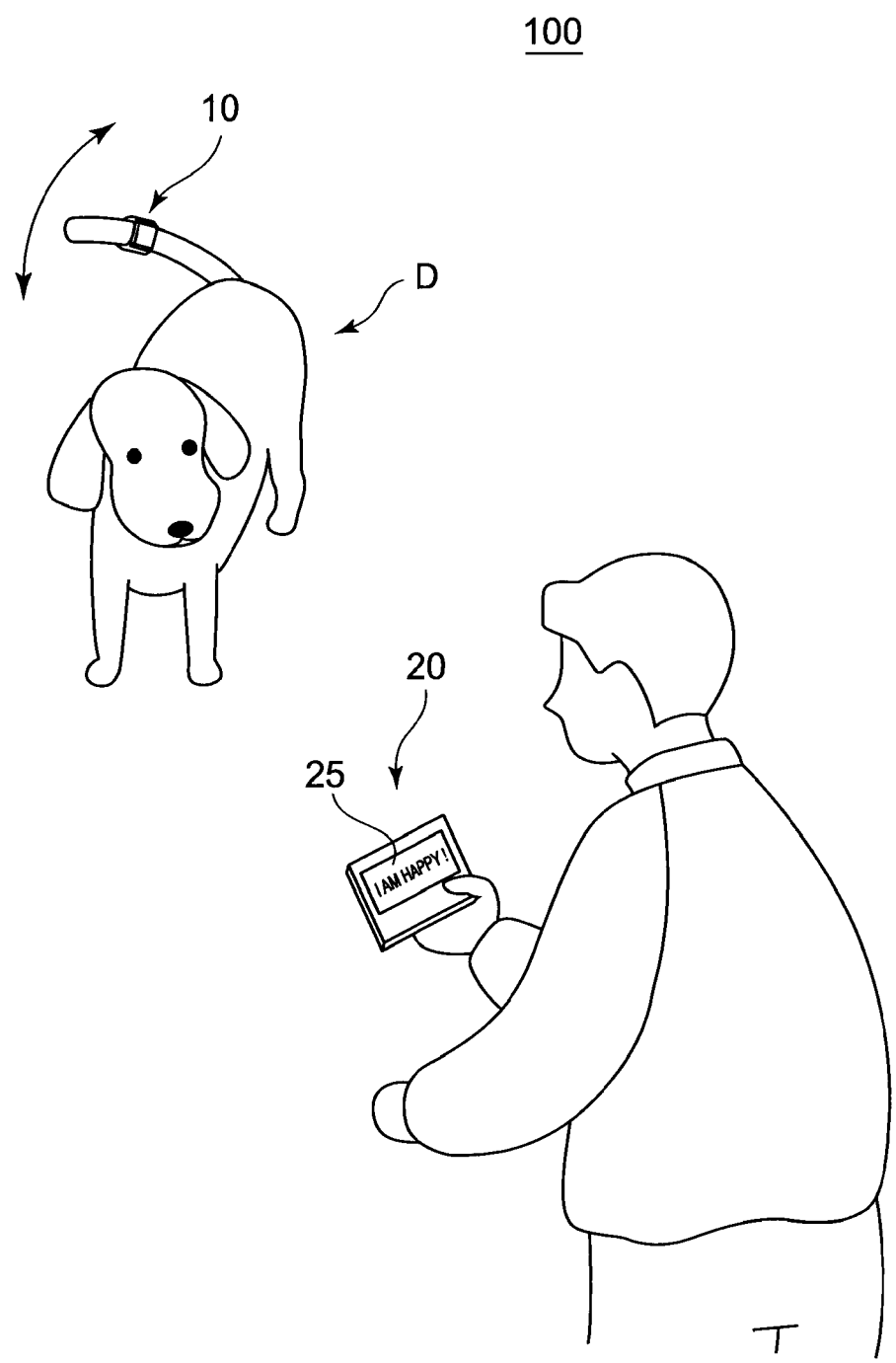
FIG. 1 shows the whole structure of an animal emotion display system.

Hereinafter, embodiments of the present invention are described in details referring to the drawings. The drawings are given byway of illustration only, and thus are not intended to limit the scope of the present invention.

FIG. 1 shows the whole structure of an animal emotion display system 100 according to an embodiment of the present invention. In the embodiment, a dog is taken as an example of an animal.

As shown in FIG. 1, the animal emotion display system 100 according to the embodiment includes a transmitter 10 which is attached to the tail of a dog D, and a receiver 20 which is capable of communicating wirelessly with the transmitter 10, namely an external device. The transmitter 10 detects emotions of the dog D by detecting tail wagging of the dog D. The transmitter 10 transmits emotion data corresponding to each detected tail wagging of the dog D to the receiver 20. The receiver 20 receives the emotion data transmitted from the transmitter 10, and displays a display content corresponding to the received emotion data on a display section 25. (See FIG. 1.)

Figure 2:
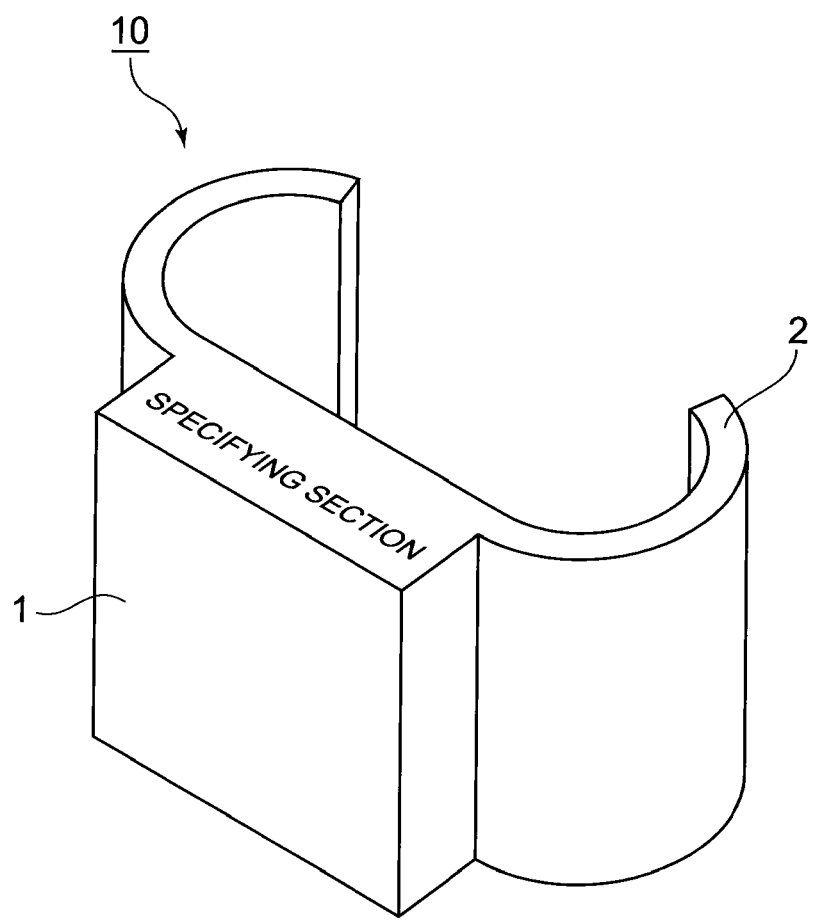
FIG. 2 is a schematic view of a transmitter.

First, the transmitter 10 is described. FIG. 2 is a schematic view of the transmitter 10. As shown in FIG. 2, the transmitter 10 includes a main body of the transmitter 1 and an attaching section 2 which is attachable to the tail of the dog D.

The attaching section 2 attaches and fixes the main body of the transmitter 1 to the tail of the dog D such that an x-axis (positive direction) of a three-axis accelerometer (tail wagging detection sensor 12), which is described below, is almost parallel to the dog D's spine (direction from the tail to the head of the dog D), a y-axis thereof is almost parallel to a direction (right-left direction) which is almost at right angles to the spine, and a z-axis thereof is almost parallel to a direction (up-down direction) which is almost at right angles to the spine.

Figure 3:
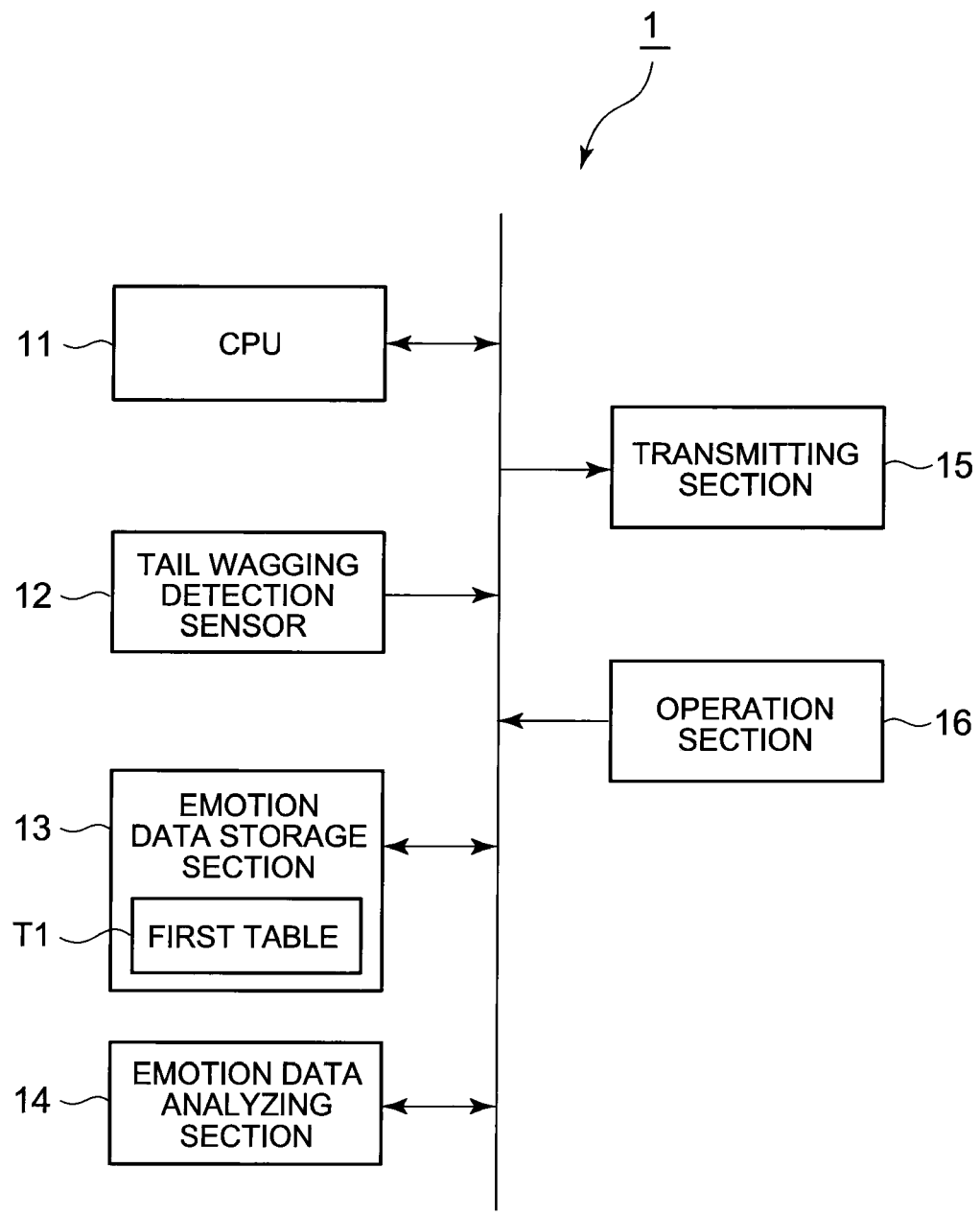
FIG. 3 is a block diagram showing a schematic structure of a main body of the transmitter.

The attaching section 2 is composed of, for example, a long MAGICTAPE®, and the transmitter 10 is attached to the tail of the dog D so as to be removable from there. FIG. 3 is a block diagram showing a main function of the main body of the transmitter 1. As shown in FIG. 3, the main body of the transmitter includes a CPU 11, a tail wagging detection sensor 12, an emotion data storage section 13, an emotion data analyzing section 14, a transmitting section 15, and an operation section 16.

The CPU 11 controls each section and the like of the main body of the transmitter 1. More specifically, the CPU 11 controls the main body of the transmitter 1 as a whole by instructing each section and the like of the main body of the transmitter 1, transferring data thereto, and the like, based on various processing programs and data.

The tail wagging detection sensor 12 includes the three-axis accelerometer, for example. The tail wagging detection sensor 12 detects the direction and frequency of each tail wagging of the dog D at an x-axis (front-back direction), a y-axis (right-left direction), and a z-axis (up-down direction) so as to generate detection data. The detection data generated by the tail wagging detection sensor 12 is output to the emotion data analyzing section 14 under the control of the CPU 11. The tail wagging detection sensor 12 functions as a detection section to detect a plurality of kinds of tail wagging of an animal as a plurality of kinds of emotion of the animal, respectively.

The emotion data storage section 13 stores a first table T1 (shown in FIG. 4) in which a plurality of kinds of tail wagging data for the respective kinds of tail wagging of the dog D are correlated with a plurality of kinds of emotion data for the respective kinds of emotion of the dog D, respectively.

FIG. 4 is a chart showing an example of the first table T1. In the first table T1, for example, a plurality of kinds of tail wagging data; "wag the tail right and left starting from right in a cycle faster than a prescribed cycle" for a time when seeing a favorable person or object, "wag the tail to and from the back" for a time when expressing a joy, "wag the tail right and left starting from left in a cycle slower than a prescribed cycle" for a time when seeing an unfavorable person or object, "wag the tail slowly" for a time when expressing affection, "lower the tail" for a time when being scared, and "the other tail waggings" are correlated with a plurality of kinds of emotion data; "GOOD MOOD 1", "GOOD MOOD 2", "BAD MOOD", "WELCOME", "SCARE", and "NONE", respectively, so as to be stored therein.

Each tail wagging data is stored, for example, as a conditional expression, which is expressed by a value of the direction and frequency of a tail wagging at the x-axis, the y-axis, and the z-axis.

The emotion data storage section 13 functions as a first storage section to correlate a plurality of kinds of tail wagging data for the respective kinds of tail wagging of an animal with a plurality of kinds of emotion data for the respective kinds of emotion of the animal, respectively, and store the plurality of kinds of tail wagging data correlated with the plurality of kinds of emotion data.

The emotion data analyzing section 14 reads emotion data corresponding to tail wagging data for a tail wagging of the dog D from the emotion data storage section 13. The tail wagging is detected by the tail wagging detection sensor 12.

More specifically, the emotion data analyzing section 14 determines whether or not a value of the direction and frequency of a tail wagging at the x-axis, the y-axis, and the z-axis of detection data generated by the tail wagging detection sensor 12 satisfies any of the conditional expressions of the plurality of kinds of tail wagging data stored in the emotion data storage section 13. Then, as shown in FIG. 4, the emotion data analyzing section 14 reads one (for example, "GOOD MOOD 1") of the plurality of kinds of emotion data corresponding to the tail wagging data (for example, "wag the tail right and left starting from right in a cycle faster than a prescribed cycle") from the emotion data storage section 13, the tail wagging data of which the conditional expression is determined to be satisfied with the value. When it is determined that a value of the direction and frequency of a tail wagging at the x-axis, the y-axis, and the z-axis of detection data does not satisfy any of the conditional expressions of the plurality of kinds of tail wagging data stored in the emotion data storage section 13, the emotion data analyzing section 14 reads the emotion data "NONE" from the emotion data storage section 13.

The emotion data analyzing section 14 functions as a reading section to read emotion data corresponding to tail wagging data for a tail wagging of an animal from the emotion data storage section 13. The tail wagging is detected by the tail wagging detection sensor 12.

The transmitting section 15 is a communication device to transmit the emotion data read by the emotion data analyzing section 14 to the receiver 20.

The transmitting section 15 is, for example, a communication device to perform wireless communications by a prescribed wireless communication system, and transmit the emotion data read by the emotion data analyzing section 14 to the receiver 20 under the control of the CPU 11. For the prescribed wireless communication system, a Bluetooth®, a wireless LAN, an infrared communication (IrDA; Infrared Data Association), and the like can be used.

The operation section 16 includes an ON-OFF switch to supply a power to the main body of the transmitter 1.

Figure 5:
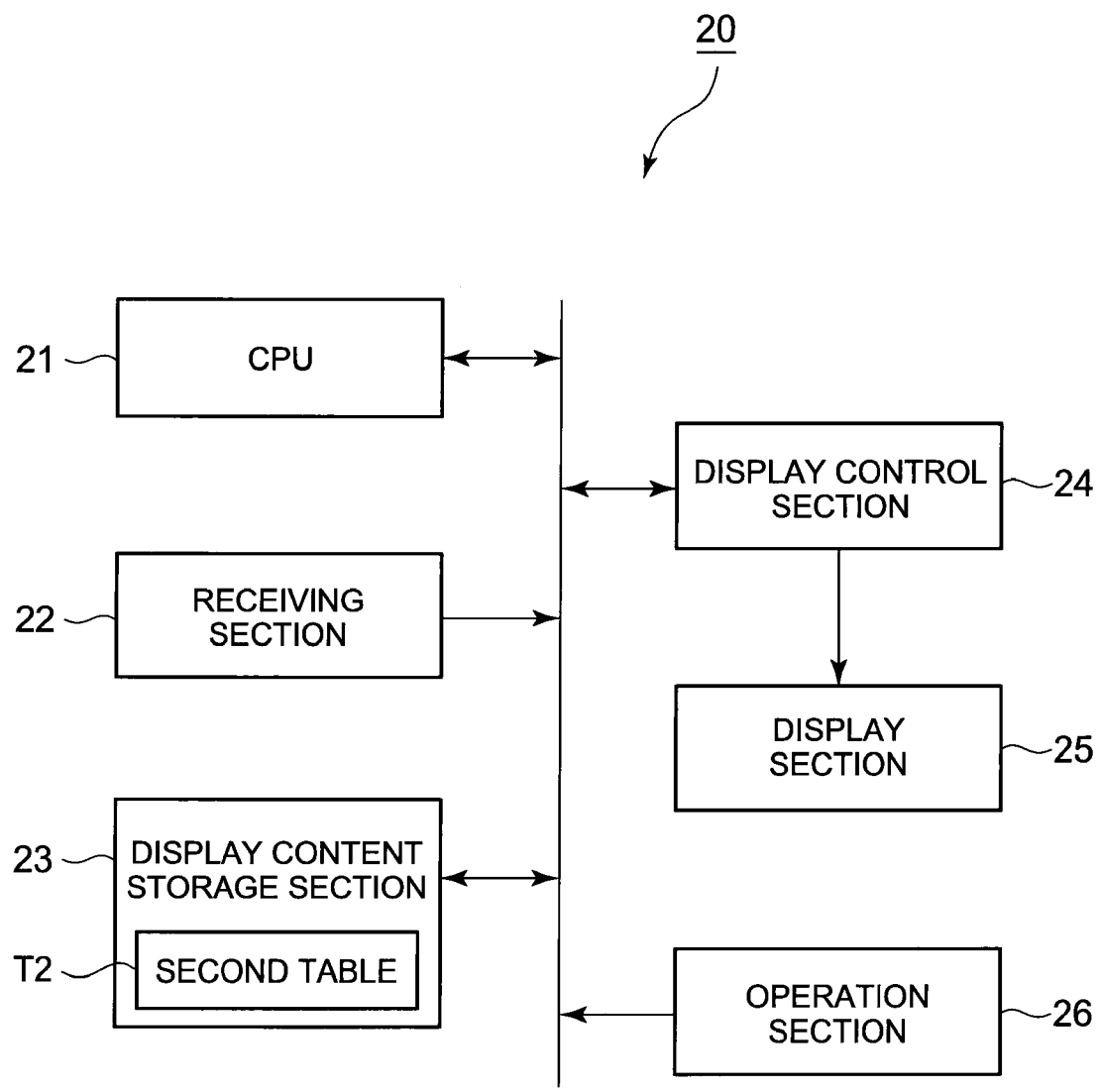
FIG. 5 is a block diagram showing a schematic structure of a receiver.

Next, the receiver 20 is described. FIG. 1 shows a schematic view of the receiver 20. FIG. 5 is a block diagram showing a main function of the receiver 20. As shown in FIG. 5, the receiver 20 includes a CPU 21, a receiving section 22, a display content storage section 23, a display control section 24, a display section 25, and an operation section 26.

The CPU 21 controls each section and the like of the receiver 20. More specifically, the CPU 21 controls the receiver 20 as a whole by instructing each section and the like of the receiver 20, transferring data thereto, and the like, based on various processing programs and data.

The receiving section 22 is a communication device to receive the emotion data transmitted by the transmitting section 15.

The receiving section 22 is a communication device to perform wireless communications by a prescribed wireless communication system which is the same as the system used by the transmitting section 15.

The display content storage section 23 stores a second table T2 (shown in FIG. 6) in which the plurality of kinds of emotion data for the respective kinds of emotion of the dog D are correlated with a plurality of kinds of display content, respectively.

A display content includes not only a message to express an emotion of an animal but also an image or an icon showing a face expression of the animal, or the like.

More specifically, as shown in FIG. 6, in the second table T2, for example, the plurality of kinds of emotion data; "GOOD MOOD 1", "GOOD MOOD 2", "BAD MOOD", "WELCOME", and "SCARE" are correlated with a plurality of kinds of display content; "I am happy", "Leave me alone (BAD MOOD)", "You are welcome here", and "I am scared", respectively, so as to be stored therein. In addition, the emotion data "NONE" is correlated with a display content ". . . " which indicates that there is no corresponding expression for the emotion, so as to be stored therein.

The display content storage section 23 functions as a second storage section to correlate the plurality of kinds of emotion data for the respective emotions of the animal with a plurality of kinds of display content, respectively, and store the plurality of kinds of emotion data correlated with the plurality of kinds of display content.

The display control section 24 outputs a display content corresponding to the emotion data received by the receiving section 22 to the display section 25.

More specifically, the display control section 24 reads a display content which is correlated with the emotion data received by the receiving section 22 from the second table T2, and displays the read display content on the display section 25.

For example, when the emotion data "GOOD MOOD 1" is received by the receiving section 22, the display control section 24 reads the display content "I am happy", which is correlated with the emotion data "GOOD MOOD 1", from the second table T2, and displays the display content "I am happy" on the display section 25 as shown in FIG. 1.

The display control section 24 functions as a display control section to output a display content to the display section 25 based on the emotion data received by the receiving section 22. More specifically, the display control section 24 reads a display content corresponding to the emotion data received by the receiver 22 from the second table T2, and displays the read display content on the display section 25.

The display section 25 displays various kinds of screens based on display signals, respectively, inputted from the display control section 24. (See FIG. 1.) The display section 25 is composed of, for example, a liquid crystal display (LCD) and the like.

The operation section 26 includes an ON-OFF switch to supply a power to the receiver 20.

Next, operating processing of the animal emotion display system 100 according to the embodiment of the present invention is described.

Figure 7:
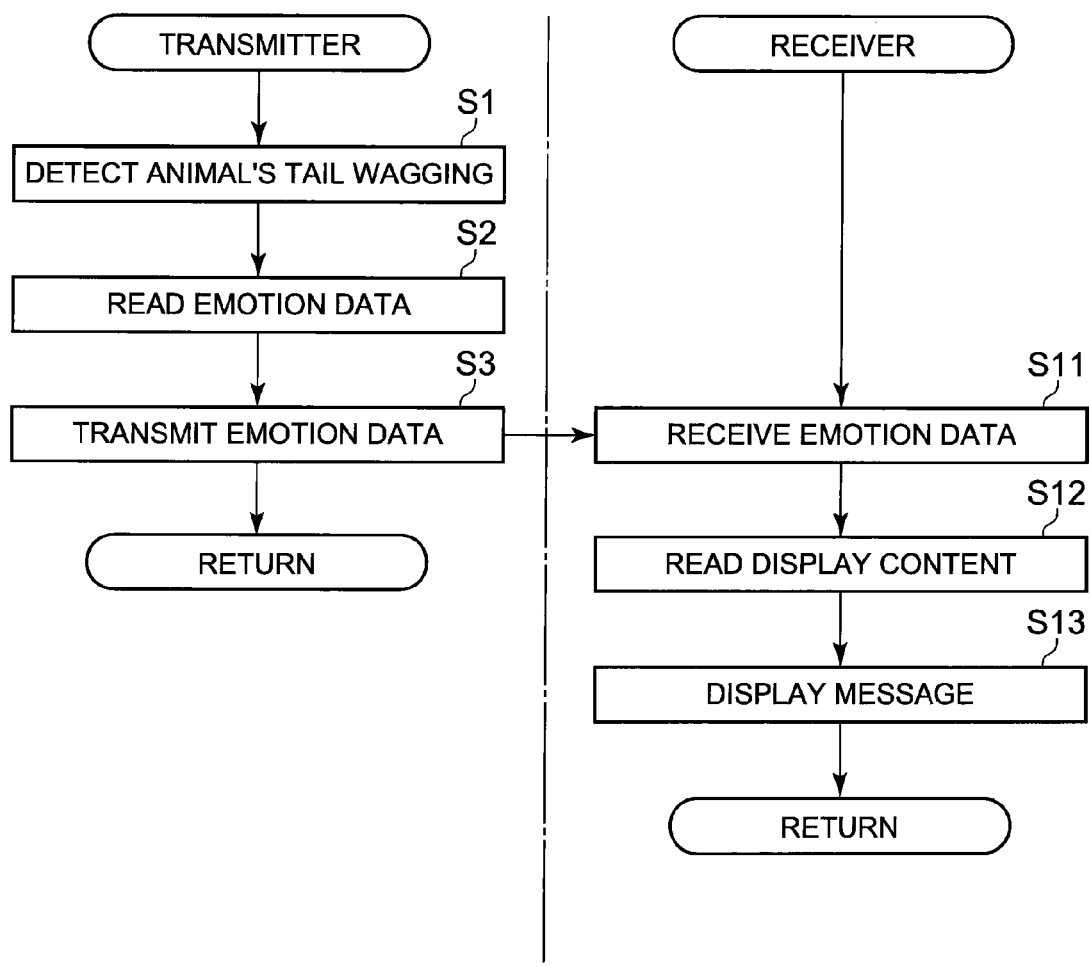
FIG. 7 is a flow chart for explaining operation processing of the animal emotion display system.

FIG. 7 is a flow chart for explaining processing of the transmitter 10 and the receiver 20, which are included in the animal emotion display system 100, according to the embodiment of the present invention.

When the dog D's tail is wagged, the transmitter 10 detects the tail wagging of the dog D by the tail wagging detection sensor 12 (Step S1). More specifically, the tail wagging detection sensor 12 detects the direction and frequency of the tail wagging of the dog D at the x-axis, the y-axis, and the z-axis, and outputs detection data generated thereby to the emotion data analyzing section 14.

Next, the emotion data analyzing section 14 reads emotion data corresponding to tail wagging data for the tail wagging of the dog D from the first table T1 (Step S2), the tail wagging detected by the tail wagging detection sensor 12. For example, when a value of the direction and frequency of the tail wagging of the dog D at the x-axis, the y-axis, and the z-axis of the detection data inputted from the tail wagging detection sensor 12 satisfies the conditional expression of the tail wagging data "wag the tail right and left starting from right in a cycle faster than a prescribed cycle", the emotion data "GOOD MOOD 1" which corresponds to the tail wagging data is read from the first table T1.

The transmitting section 15 transmits the emotion data read from the first table T1 (for example, "GOOD MOOD 1") to the receiver 20 via a prescribed communication line (Step S3), and ends the processing of the transmitter 10.

When the emotion data transmitted from the transmitter 10 is received by the receiver 20 (Step S11), the display control section 24 reads a display content corresponding to the emotion data received by the receiving section 22 from the display content storage section 23 (Step S12). For example, when the emotion data "GOOD MOOD 1" is received from the transmitter 10, as shown in FIG. 6, the display control section 24 reads from the second table T2 the display content "I am happy" which corresponds to the emotion data "GOOD MOOD 1" received by the receiving section 22.

Next, the display control section 24 displays the display content on the display section 25 (Step S13). More specifically, as shown in FIG. 1, the display control section 24 displays a message "I am happy" on the display section 25, and then ends the processing of the receiver 20.

As described above, by the animal emotion display system 100 according to the embodiment of the present invention, emotion data for an emotion of the dog D, the emotion data transmitted from the transmitting section 15, can be received even at a place which is away from where the dog D is via the receiving section 22, and a display content corresponding to the emotion data can be displayed on the display section 25 by the display control section 24 since the transmitter 10 and the receiver 20 can communicate wirelessly with each other. Consequently, a human (for example, a pet owner) can appropriately understand an emotion of the dog D by seeing and checking a display content displayed on the display section 25 even when not being at the dog D's side. Moreover, an emotion of an animal (emotion data) is read based on tail wagging data detected by the tail wagging detection sensor 12, so that there is no worry about not being able to display an emotion of another animal. Such worry arises when an emotion of a specified animal is identified by picking up a cry of the specified animal by using a microphone since the microphone may pick up a cry of another animal (dog, for example) which is at a place close to where the specified animal is, and/or may pick up a noise which occurs around the specified animal.

Furthermore, the emotion data analyzing section 14 reads emotion data corresponding to tail wagging data for a tail wagging of the dog D from the emotion data storage section 13. The tail wagging is detected by the tail wagging detection sensor 12. Consequently, a load of arithmetic processing which is performed so as to identify emotion data can be reduced, and accordingly prompt analyzing of emotion data can be achieved.

[First Modification]

Next, the animal emotion display system 100 according to a first modification of the present invention is described.

Figure 8:
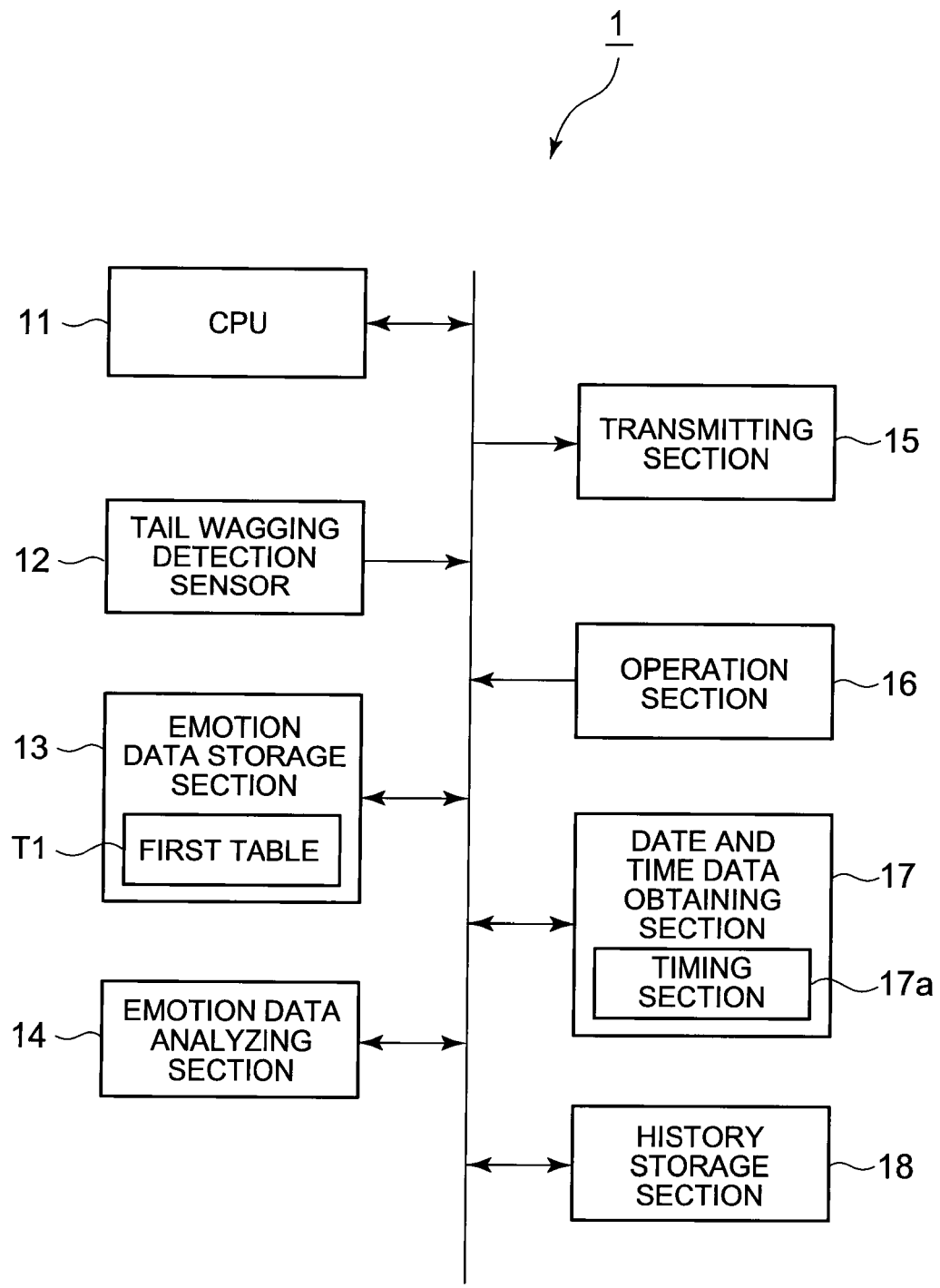
FIG. 8 is a block diagram showing a schematic structure of the main body of the transmitter according to a first modification of the present invention.

FIG. 8 is a block diagram showing the main body of the transmitter 1 according to the first modification. As shown in FIG. 8, the main body of the transmitter 1 in the first modification further includes a date and time data obtaining section 17 and a history storage section 18. The components other than the date and time data obtaining section 17 and the history storage section 18 are similar to the components in the embodiment, and hence descriptions thereof are omitted.

The date and time data obtaining section 17 includes a timing section 17a, and obtains date and time data when a tail wagging of the dog D is detected by the tail wagging detection sensor 12.

For example, when a tail wagging of the dog D is detected by the tail wagging detection sensor 12 at □:Δ (time) on ○ (month) X (date), the date and time data obtaining section 17 obtains date and time data of the date and time, namely, : Δ (time) on ○ (month) X (date).

The date and time obtaining section 17 functions as an obtaining section to obtain a date and time on which a tail wagging of an animal is detected by the tail wagging detection sensor 12.

The history storage section 18 correlates date and time data of the date and time obtained by the date and time data obtaining section 17 with the emotion data read by the emotion data analyzing section 14 corresponding to tail wagging data for the tail wagging of the dog D. The tail wagging is detected on the date and time by the tail wagging detection sensor 12, and the history storage section 18 stores the date and time data correlated with the emotion data therein.

For example, when the emotion data "GOOD MOOD 1" is read by the emotion data analyzing section 14 based on tail wagging data for a tail wagging of the dog D detected at □:∆ (time) on ○ (month) X (date) by the tail wagging detection sensor 12, the history storage section 18 correlates date and time data "□:∆ (time) on ○ (month) X (date)" with the emotion data "GOOD MOOD 1", and stores the date and time data correlated with the emotion data therein. For another example, when the emotion data "BAD MOOD" is read by the emotion data analyzing section 14 based on tail wagging data for a tail wagging of the dog D detected at X:○ (time) on ∆ (month) □ (date) by the tail wagging detection sensor 12, the history storage section 18 correlates date and time data "X:○ (time) on ∆ (month) □ (date)" with the emotion data "BAD MOOD", and stores the date and time data correlated with the emotion data therein.

The history storage section 18 functions as a history storage section to store at least one set of date and time data of a date and time obtained by the date and time data obtaining section 17 and emotion data for a tail wagging, which is detected on the date and time by the tail wagging detection sensor 12, of an animal, the date and time data and the emotion data being correlated with each other therein.

Under the control of the CPU 11, the transmitting section 15 transmits the date and time data and the emotion data, which are correlated with each other and stored in the history storage section 18, to the receiver 20 when a first instruction to transmit the date and time data and the emotion data, which are correlated with each other and stored in the history storage section 18, to the receiver 20 is input by human's operation of a first instruction transmitting button (not shown), for example. Namely, the transmitting section 15 transmits the date and time data and the emotion data, which are correlated with each other and stored in the history storage section 18, to the receiver 20 when the first instruction is detected by the CPU 11. The CPU 11 functions as a first instruction detection section.

The display control section 24 reads a display content corresponding to the emotion data received by the receiving section 22 from the second table T2. Then, the display control section 24 correlates the display content (for example, "I am happy") with a date and time (for example, □:∆ (time) on X (month) ○ (date)) of the date and time data correlated with the emotion data, and displays the display content correlated with the date and time on the display section 25.

As described above, by the animal emotion display system 100 according to the first modification, at least one set of date and time data and emotion data, which are correlated with each other and stored in the history storage section 18, is transmitted from the transmitter 10. Accordingly, a date and time and a display content, which are correlated with each other, can be displayed on the display section 25 in the receiver 20. Consequently, it can be understood when an emotion is expressed by the dog D.

In addition, the animal emotion display system 100 stores date and time data and emotion data in the history storage section 18, the date and time data and the emotion data being correlated with each other therein. Consequently, all the emotions of the past (for example, during a pet owner's absence) of the dog D can be understood by transmitting from the transmitter 10 all of the date and time data and the emotion data which are correlated with each other, respectively, and are stored in the history storage section 18 in the past.

According to the animal emotion display system 100 in the first modification, at least one set of date and time data and emotion data is stored in the history storage section 18, but not limited thereto. For example, at least one set of date and time data of a date and time obtained by the date and time data obtaining section 17 and tail wagging data for a tail wagging of the dog D, the tail wagging detected on the date and time by the tail wagging detection sensor 12, may be stored in the history storage section 18, the date and time data and the tail wagging data being correlated with each other therein. Then, in the transmitter 10, the emotion data analyzing section 14 identifies emotion data based on the tail wagging data correlated and stored with the date and time data in the history storage section 18, by user's operation of the transmission instruction button. Under the control of the CPU 11, the transmitting section 15 transmits at least one set of date and time data stored in the history storage section 18 and emotion data identified by the emotion data analyzing section 14, the date and time data and the emotion data being correlated with each other.

[Second Modification]

Next, the animal emotion display system 100 according to a second modification of the present invention is described.

Figure 9:
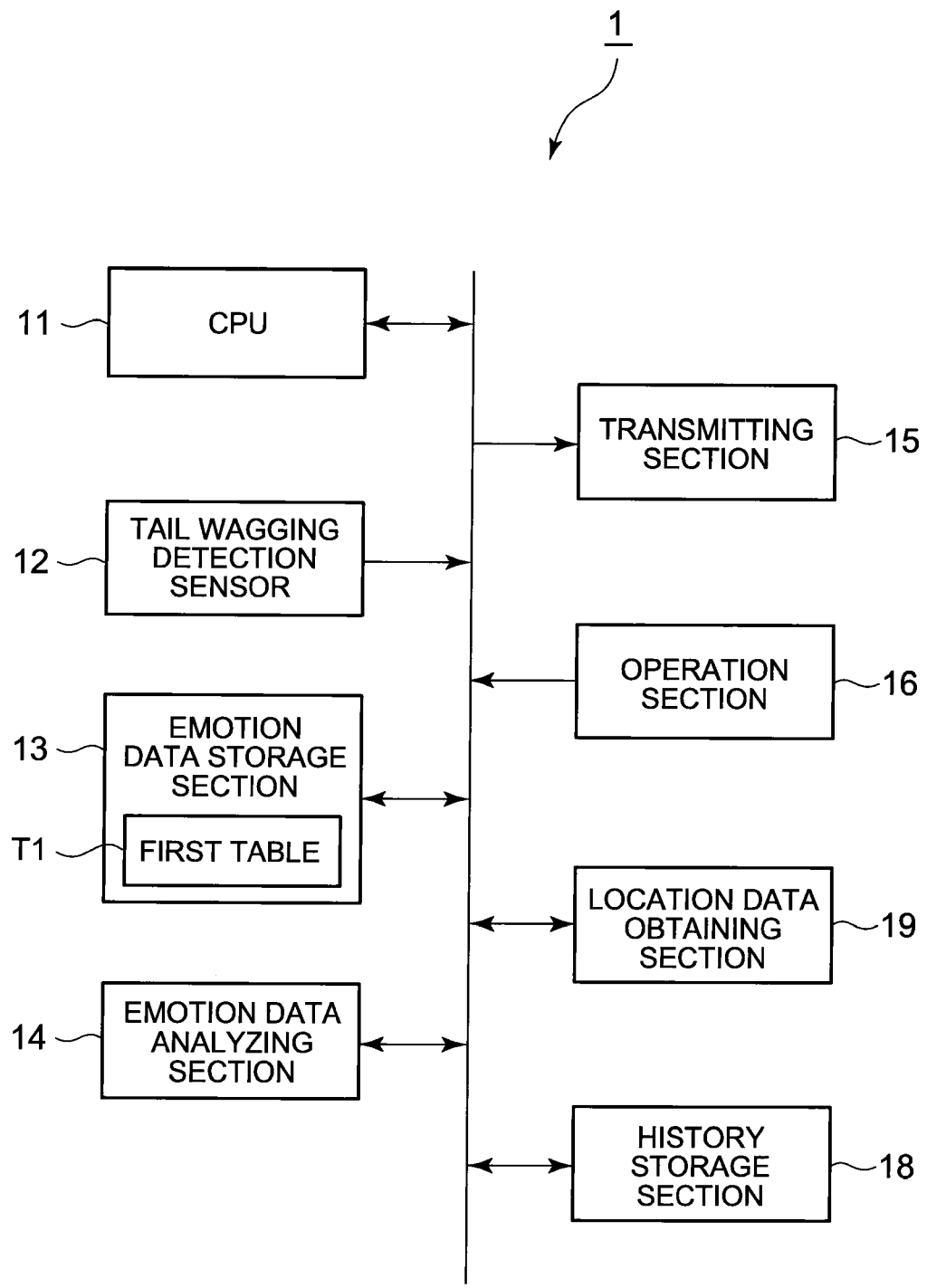
FIG. 9 is a block diagram showing a schematic structure of the main body of the transmitter according to a second modification of the present invention.

FIG. 9 is a block diagram showing the main body of the transmitter 1 according to the second modification. As shown in FIG. 9, the main body of the transmitter 1 in the second modification further includes a history storage section 18 and a location data obtaining section 19.

The components other than the location data obtaining section 19 and the history storage section 18 are similar to the components in the embodiment, and hence descriptions thereof are omitted.

The location data obtaining section 19 obtains location data of a location where the dog D is, the dog D of which a tail wagging is detected by the tail wagging detection sensor 12. More specifically, the location data obtaining section 19 includes a global positioning system (GPS) function and/or a mobile phone function. The location data obtaining section 19 detects a location of a tail wagging of the dog D by utilizing a GPS satellite and/or a mobile telecommunication station.

When a tail wagging of the dog D is detected by the tail wagging detection sensor 12, the location data obtaining section 19 obtains location data of the location where the tail wagging is detected, for example, at latitude ○ degrees north and longitude ∆ degrees east.

The location data obtaining section 19 functions as an obtaining section to obtain a location where an animal is, the animal whose tail wagging is detected by the tail wagging detection sensor 12.

The emotion data analyzing section 14 reads emotion data based on location data of a location obtained by the location data obtaining section 19 and tail wagging data for a tail wagging of the dog D, the tail wagging detected at the location by the tail wagging detection sensor 12. The history storage section 18 correlates the location data with the emotion data read by the emotion data analyzing section 14, and stores the location data correlated with the emotion data therein.

For example, when the emotion data "GOOD MOOD 1" is read by the emotion data analyzing section 14 based on tail wagging data for a tail wagging of the dog D, the tail wagging detected at latitude ○ degrees north and longitude ∆ degrees east by the tail wagging detection sensor 12, the history storage section 18 correlates location data "latitude ○ degrees north and longitude ∆ degrees east" with the emotion data "GOOD MOOD 1", and stores the location data correlated with the emotion data therein. For another example, when the emotion data "BAD MOOD" is read by the emotion data analyzing section 14 based on tail wagging data for a tail wagging of the dog D. The tail wagging is detected at latitude X degrees north and longitude ☐ degrees east by the tail wagging detection sensor 12, the history storage section 18 correlates location data "latitude X degrees north and longitude ☐ degrees east" with the emotion data "BAD MOOD 1", and stores the location data correlated with the emotion data therein.

The history storage section 18 functions as a history storage section to store at least one set of location data of a location obtained by the location data obtaining section 19 and emotion data for a tail wagging of an animal detected at the location by the tail wagging detection sensor 12, the location data and the emotion data being correlated with each other therein.

Under the control of the CPU 11, the transmitting section transmits location data and emotion data, which are correlated with each other and stored in the history storage section 18, to the receiver 20, when a second instruction to transmit location data and emotion data, which are correlated with each other and stored in the history storage section 18, to the receiver 20 is input by human's operation of a second instruction transmitting button (not shown), for example. Namely, transmitting section 15 transmits location data and emotion data, which are correlated with each other and stored in the history storage section 18, to the receiver 20, when the second instruction is detected by the CPU 11. The CPU 11 functions as a second instruction detection section.

The display control section 24 reads a display content corresponding to the emotion data received by the receiving section 22 from the second table T2. Then, the display control section 24 correlates the display content (for example, "I am happy") with a location (for example, "latitude ○ degrees north and longitude △ degrees east") of the location data which is correlated with the emotion data, and displays the display content correlated with the location on the display section 25.

As described above, by the animal emotion display system 100 according to the second modification, at least one set of location data and emotion data, which are correlated with each other and stored in the history storage section 18, is transmitted from the transmitter 10 to the receiver 20. Accordingly, a location and a display content, which are correlated with each other, can be displayed on the display section 25 in the receiver 20. Consequently, a user can understand where an emotion is expressed by the dog D.

In addition, the animal emotion display system 100 stores location data and emotion data in the history storage section 18, the location data and the emotion data being correlated with each other therein. Consequently, it can be understood where and what emotions the dog D has had in the past (for example, during a pet owner's absence) by transmitting from the transmitter 10 all of the location data and the emotion data, which are correlated with each other, respectively, and are stored in the history storage section 18 in the past.

According to the animal emotion display system 100 in the second modification, the history storage section 18 stores at least one set of location data and emotion data, but is not limited thereto. For example, the history storage section 18 may store at least one set of location data of a location obtained by the location data obtaining section 19 and tail wagging data for a tail wagging, which is detected at the location by the tail wagging detection sensor 12, of the dog D, the location data and the tail wagging data being correlated with each other therein. Then, the emotion data analyzing section 14 identifies emotion data based on the tail wagging data correlated and stored with the location data in the history storage section 18. Under the control of the CPU 11, the transmitting section 15 transmits at least one set of location data which is stored in the history storage section 18 and emotion data which is read by the emotion data analyzing section 14, to the receiver 20, the location data and the emotion data being correlated with each other.

In the embodiments, it is not necessary to include the emotion data storage section 13. Instead, the emotion data analyzing section 14 may perform arithmetic processing based on tail wagging data for a tail wagging of the dog D, the tail wagging detected by the tail wagging detection sensor 12, so as to identify emotion data. As a result, more flexible analyzing of emotion data becomes available as compared with a case where emotion data is read from the emotion data storage section 13. Accordingly, emotions of the dog D can be understood more appropriately.

In the embodiments, the tail wagging detection sensor 12 and the emotion data analyzing section 14 may function as the detection section.

The emotion data storage section 13 may store a plurality of kinds of tail wagging data correlated with a plurality of kinds of emotion data, respectively, with regard to a plurality of species of animal (for example, a dog and a cat) and a plurality of types (for example, a large-sized dog, a middle-sized dog, and a small-sized dog) of the respective species of animal. Then, the main body of the transmitter 1 may further include a specification input button (specifying section) to specify a species of animal (for example, a cat) among from the plurality of species of animal, and a type (for example, a male) of the respective species of animal from the plurality of types of the respective species of animal so that tail waggings of the specified type of the specified species of animal are detected.

More specifically, when emotions of a male cat are desired to be displayed, a user specifies "CAT" among from a plurality of species of animal as a species of animal whose tail waggings are detected, and specifies "MALE" as a type of the specified species of animal, namely, "CAT", by the specification input button included in the main body of the transmitter 1.

The emotion data analyzing section 14 identifies emotion data from the first table T1 which is for a male cat, and the display control section 24 reads a display content corresponding to the identified emotion data from the second table T2 which is for a male cat.

In the case of a male cat, for example, a plurality of kinds of tail wagging data; "stretch up the tail" for a time when seeking attention, "tuck the tail under the body" for a time when being scared, "wag the tail slowly right and left" for a time when not being able to make up its mind owing to being excited, and "wag the tail slowly up and down" for a time when thinking are correlated with a plurality of kinds of emotion data; "HUNGRY", "SCARE", "CONFUSION", and "THOUGHT" in the first table T1 for a male cat, respectively. The plurality of kinds of emotion data "HUNGRY", "SCARE", "CONFUSION", "THOUGHT" are correlated with a plurality of kinds of display content; "I am hungry", "I am scared", "I cannot make up my mind", and "what shall I do?" in the second table T2 for a male cat, respectively.

Consequently, emotions of an animal can be appropriately understood according to each species of animal, such as a dog or a cat. In addition, emotions of an animal can be more appropriately understood according to each type of each species of animal.

In the embodiment, the tail wagging detection sensor 12 includes the three-axis accelerometer, but is not limited thereto. As long as the tail wagging detection sensor 12 includes at least one of a three-axis accelerometer, a gyroscope, and a magnetometer, it is an optional.

By using any two or all of the three-axis accelerometer, the gyroscope, and the magnetometer in combination, tail waggings of each animal, the tail waggings which match characteristics of each animal, can be detected. Accordingly, emotions of an animal can be more appropriately understood.

It is not necessary that communications between the transmitting section 15 and the receiving section 22 are wireless communications. As long as emotion data can be received at a place which is away from where the dog D is, the communications between them may be cable communications.

According to a first aspect of the preferred embodiments of the present invention, there is provided an animal emotion display system including: a transmitter which is attached to an animal; and a receiver which is capable of communicating with the transmitter, wherein the transmitter includes: a detection section to detect a plurality of kinds of tail wagging of the animal as a plurality of kinds of emotion of the animal, respectively; and a transmitting section to transmit emotion data corresponding to the respective kinds of tail wagging detected by the detection section to the receiver, and the receiver includes: a receiving section to receive the emotion data transmitted by the transmitting section; a display section; and a display control section to display a display content corresponding to the emotion data received by the receiving section on the display section.

According to a second aspect of the preferred embodiments of the present invention, there is provided an animal emotion display method using an animal emotion display system including a transmitter which is attached to an animal and a receiver which is capable of communicating with the transmitter, the animal emotion display method including the steps of: detecting a plurality of kinds of tail wagging of an animal as a plurality of kinds of emotion of the animal, respectively, by the transmitter; transmitting emotion data corresponding to the respective kinds of tail wagging detected by the transmitter to the receiver; receiving the emotion data by the receiver, the emotion data being transmitted by the transmitter; and outputting a display content corresponding to the received emotion data to a display section of the receiver.

Preferably, the transmitter further includes: an obtaining section to obtain a date and time on which a tail wagging of the animal is detected by the detection section; and a history storage section to store at least one set of date and time data of the date and time obtained by the obtaining section and the emotion data corresponding to the tail wagging detected at the date and time by the detection section, the date and time data and the emotion data being correlated with each other, and the transmitting section transmits at least one set of the date and time data and the emotion data which are correlated with each other and stored in the history storage section.

Preferably, the transmitter further includes: an obtaining section to obtain a date and time on which a tail wagging of the animal is detected by the detection section; and a history storage section to store at least one set of date and time data of the date and time obtained by the obtaining section and tail wagging data for the tail wagging detected at the date and time by the detection section, the date and time data and the tail wagging data being correlated with each other, and the transmitting section transmits at least one set of the date and time data stored in the history storage section and the emotion data corresponding to the tail wagging data which is correlated with the date and time data, the date and time data and the emotion data being correlated with each other.

Preferably, the transmitter further includes: a first instruction detection section to detect a first instruction to transmit the date and time data stored in the history storage section and the emotion data to the receiver, the date and time data and the emotion data being correlated with each other, and the transmitting section transmits at least one set of the date and time data stored in the history storage section and the emotion data to the receiver, the date and time data and the emotion data being correlated with each other, based on the first instruction detected by the first instruction detection section.

Preferably, the transmitter further includes: an obtaining section to obtain a location of the animal whose tail wagging is detected by the detection section; and a history storage section to store at least one set of location data of the location obtained by the obtaining section and the emotion data corresponding to the tail wagging detected at the location by the detection section, the location data and the emotion data being correlated with each other, and the transmitting section transmits at least one set of the location data and the emotion data which are correlated with each other and stored in the history storage section.

Preferably, the transmitter further includes: an obtaining section to obtain a location of the animal whose tail wagging is detected by the detection section; and a history storage section to store at least one set of location data of the location obtained by the obtaining section and tail wagging data for the tail wagging detected at the location by the detection section, the location data and the tail wagging data being correlated with each other, and the transmitting section transmits at least one set of the location data stored in the history storage section and the emotion data corresponding to the tail wagging data which is correlated with the location data, the location data and the emotion data being correlated with each other.

Preferably, the transmitter further includes: a second instruction detection section to detect a second instruction to transmit the location data stored in the history storage section and the emotion data to the receiver, the location data and the emotion data being correlated with each other, and the transmitting section transmits at least one set of the location data stored in the history storage section and the emotion data to the receiver, the location data and the emotion data being correlated with each other, based on the second instruction detected by the second instruction detection section.

Preferably, the detection section includes at least one of a three-axis accelerometer, a gyroscope, and a magnetometer.

Preferably, the transmitter further includes: a first storage section to store a plurality of kinds of tail wagging data for the respective kinds of tail wagging and a plurality of kinds of emotion data for the respective kinds of emotion, the plurality of kinds of tail wagging data being correlated with the plurality of kinds of emotion data, respectively; and a reading section to read one of the plurality of kinds of emotion data corresponding to tail wagging data for a tail wagging detected by the detection section from the first storage section, and the transmitting section transmits the emotion data read by the reading section to the receiver.

Preferably, the first storage section stores the plurality of kinds of tail wagging data correlated with the plurality of kinds of emotion data, respectively, with regard to at least one of a plurality of species of animal and a plurality of types of the respective species of animal, and the transmitter further includes a specifying section to specify a species of animal among from the plurality of species of animal, and a type of the respective species of animal from the plurality of types of the respective species of animal so that a tail wagging of the specified type of the specified species of animal is detected.

Preferably, tail wagging data for a tail wagging of the animal, the tail wagging being detected by the detection section, includes at least one of a direction and a frequency of the tail wagging.

Preferably, the receiver further includes: a second storage section to store a plurality kinds of emotion data for the respective kinds of emotion and a plurality of kinds of display content, the plurality of kinds of emotion data being correlated with the plurality of kinds of display content, respectively, and the display control section reads one of the plurality of kinds of display content corresponding to the emotion data received by the receiving section from the second storage section, and outputs the display content read by the display control section to the display section.

Preferably, the transmitter is attached to a tail of the animal whose tail wagging is detected by the detection section.

According to the animal emotion display system of the embodiments of the present invention, emotions of an animal can be appropriately understood without a need to be at the animal's side by outputting display contents showing the emotions of the animal from a receiver which is capable of communicating with a transmitter.

Although various exemplary embodiments have been shown and described, the invention is not limited to the embodiments shown. Therefore, the scope of the invention is intended to be limited solely by the scope of the claims that follow.

What is claimed is:

1. An animal emotion display system comprising:
a transmitter which is attachable to an animal; and
a receiver which communicates with the transmitter,
wherein the transmitter includes:
   a detection section to detect a movement pattern of the animal;
   a first obtaining section to obtain emotion data corresponding to the detected movement, and to obtain, in response to detection of the movement by the detection section, location data at a timing when the movement is detected by the detection section, the location data indicating a location of the transmitter at the timing when the movement is detected by the detection section; and
   a transmitting section to transmit to the receiver the emotion data and the location data;
wherein the receiver includes:
   a receiving section to receive the emotion data and the location data, both of which are transmitted by the transmitting section;
   a display section; and
   a display control section to display on the display section the emotion data and the location data which is obtained only at the timing when the movement is detected by the detection section, both of which are received by the receiving section.

2. The animal emotion display system according to claim 1, wherein the transmitter further includes:
a second obtaining section to obtain a date and time on which the movement of the animal is detected by the detection section; and
a history storage section to store at least one set of date and time data of the date and time and the emotion data corresponding to the movement detected at the date and time by the detection section, the date and time data and the emotion data being correlated with each other, and
wherein the transmitting section transmits at least one set of the date and time data and the kind of emotion data which are correlated with each other and stored in the history storage section.

3. The animal emotion display system according to claim 1, wherein the transmitter further includes:
a second obtaining section to obtain a date and time on which the movement of the animal is detected by the detection section; and
a history storage section to store at least one set of date and time data of the date and time and movement data for the movement detected at the date and time by the detection section, the date and time data and the movement data being correlated with each other, and
wherein the transmitting section transmits at least one set of the date and time data stored in the history storage section and the emotion data corresponding to the movement of the movement data which is correlated with the date and time data, the date and time data and the emotion data being correlated with each other.

4. The animal emotion display system according to claim 3, wherein the transmitter further includes:
an instruction detection section to detect an instruction to transmit the date and time data stored in the history storage section and the corresponding emotion data to the receiver, the date and time data and the emotion data being correlated with each other, and
wherein the transmitting section transmits at least one set of the date and time data stored in the history storage section and the corresponding emotion data to the receiver, the date and time data and the emotion data being correlated with each other, based on the instruction detected by the instruction detection section.

5. The animal emotion display system according to claim 1, wherein the transmitter further includes:
a history storage section to store at least one set of location data of the location obtained by the first obtaining section and the emotion data corresponding to the movement detected at the location by the detection section, the location data and the emotion data being correlated with each other, and
wherein the transmitting section transmits at least one set of the location data and the emotion data which are correlated with each other and stored in the history storage section.

6. The animal emotion display system according to claim 1, wherein:
the detection section detects a plurality of movements;
the first obtaining section obtains a plurality of pieces of emotion data corresponding to the respective movements, and a plurality of pieces of location data at respective timings when the movements are detected by the detection section;
the transmitter further includes a history storage section to store at least one set of location data and corresponding movement data for the movement detected at the timing of obtaining the location data, the location data and the movement data being correlated with each other, and
wherein the transmitting section transmits at least one set of the location data stored in the history storage section and the emotion data corresponding to the movement of the movement data that is correlated with the location data.

7. The animal emotion display system according to claim 6, wherein the transmitter further includes:
an instruction detection section to detect an instruction to transmit the location data stored in the history storage section and the corresponding emotion data to the receiver, the location data and the emotion data being correlated with each other, and wherein the transmitting section transmits at least one set of the location data stored in the history storage section and the corresponding emotion data to the receiver, the location data and the emotion data being correlated with each other, based on the instruction detected by the instruction detection section.

8. The animal emotion display system according to claim 1, wherein the detection section includes at least one of a three-axis accelerometer, a gyroscope, and a magnetometer.

9. The animal emotion display system according to claim 1, wherein the transmitter further includes:
   a first storage section to store movement data for the movement and the emotion data, the movement data being correlated with the corresponding emotion data; and
   a reading section to read emotion data corresponding to the movement data which corresponds to the movement detected by the detection section from the first storage section, and
   wherein the transmitting section transmits the emotion data read by the reading section to the receiver.

10. The animal emotion display system according to claim 9, wherein:
   the first storage section stores the movement data correlated with the emotion data with regard to at least one of a plurality of species of animal and a plurality of types of the respective species of animal, and
   the transmitter further includes a specifying section to specify a species of animal among from the plurality of species of animal, and a type of the respective species of animal from the plurality of types of the respective species of animal so that a predetermined pattern of the specified type of the specified species of animal is determined which corresponds to the detected movement.

11. The animal emotion display system according to claim 1, wherein movement data of the detected movement includes at least one of a direction and a frequency of movement of the detected movement.

12. The animal emotion display system according to claim 1,
   wherein the receiver further includes:
      a storage section to store a plurality of kinds of emotion data and a plurality of display contents corresponding respectively to the plurality of kinds of emotion data, the plurality of kinds of emotion data being correlated with the respective corresponding display contents, and
   wherein the display control section reads one of the display content corresponding to the emotion data received by the receiving section from the storage section, and outputs said one of the display contents read by the display control section to the display section.

13. The animal emotion display system according to claim 1, wherein the transmitter is attachable to a tail of the animal whose tail wagging is detected by the detection section as the movement.

14. An animal emotion display method using an animal emotion display system including a transmitter which is attachable to an animal and a receiver which communicates with the transmitter, the animal emotion display method comprising:
   detecting, with the transmitter, a movement of the animal;
   obtaining emotion data corresponding to the detected movement, and obtaining, in response to detection of the movement, location data at a timing when the movement is detected, the location data indicating a location of the transmitter at the timing when the movement is detected;
   transmitting, from the transmitter to the receiver, the emotion data and the location data;
   receiving, with the receiver, the emotion data and the location data, both of which are transmitted by the transmitter; and
   displaying, on a display section, the emotion data and the location data which is obtained only at the timing when the movement is detected, both of which are received by the receiver.

* * * * *

UNITED STATES PATENT AND TRADEMARK OFFICE
CERTIFICATE OF CORRECTION

| | | |
|---|---|---|
| PATENT NO. | : 9,019,105 B2 | Page 1 of 1 |
| APPLICATION NO. | : 12/834066 | |
| DATED | : April 28, 2015 | |
| INVENTOR(S) | : Hiroki Takahashi | |

It is certified that error appears in the above-identified patent and that said Letters Patent is hereby corrected as shown below:

In the Claims

Column 13, claim 1, line 5, after "movement" delete "pattern".

Signed and Sealed this
Sixteenth Day of February, 2016

Michelle K. Lee
*Director of the United States Patent and Trademark Office*